United States Patent [19]
Culbertson et al.

[11] Patent Number: 5,476,352
[45] Date of Patent: Dec. 19, 1995

[54] TRANSPORTING AND SETTING UTILITY POLES IN INACCESSIBLE LOCATIONS

[75] Inventors: Van H. Culbertson, Leicester; John S. Jones, Asheville; Orville J. Arwood, Weaverville; Luther H. Ball, Marshall; Alfred D. Galloway, Asheville, all of N.C.

[73] Assignee: Carolina Power & Light Company, Raleigh, N.C.

[21] Appl. No.: 252,959

[22] Filed: Jun. 2, 1994

[51] Int. Cl.$^6$ ................................................ A01G 23/02
[52] U.S. Cl. .................................... 414/23; 414/786
[58] Field of Search ................................. 414/23, 22, 54, 414/10, 746.8, 786; 254/323, 380, 387

[56] References Cited

U.S. PATENT DOCUMENTS

| | | | |
|---|---|---|---|
| 713,501 | 11/1902 | Ryder | 414/23 |
| 1,174,950 | 3/1916 | Sedgwick | |
| 1,317,816 | 10/1919 | Nyrop | |
| 1,470,377 | 7/1922 | Kimberling | |
| 2,138,842 | 3/1937 | Drew | |
| 2,235,215 | 3/1941 | Kelly | |
| 2,281,713 | 5/1942 | Pyeatt | |
| 3,064,991 | 11/1962 | Huthsing, Jr. | |
| 3,112,037 | 11/1963 | Thiermann | |
| 3,191,786 | 6/1965 | Langrell | |
| 3,822,800 | 7/1974 | Leszcynski | |
| 5,037,118 | 8/1991 | Straube | 280/79.6 |
| 5,116,068 | 5/1992 | Declouette | |
| 5,354,164 | 10/1994 | Goss et al. | 224/42.08 |

FOREIGN PATENT DOCUMENTS 646865  10/1962  Italy ......................................... 414/23

OTHER PUBLICATIONS

Thiermann, Comb. Pole Setter & Transformer Dolly, 1962.
"E-Z Hauler", S.D.P. Inc.
"Texoma Mini Derrick", Reedrill, Inc.

*Primary Examiner*—Michael S. Huppert
*Assistant Examiner*—Douglas A. Hess
*Attorney, Agent, or Firm*—Richard S. Faust

[57] ABSTRACT

A dolly-like device and associated operational procedure facilitate the transporting and setting of utility poles at locations inaccessible to motor vehicles. The dolly-like device includes a power winch that is utilized to provide the power to raise the pole in the pole setting operation.

10 Claims, 7 Drawing Sheets

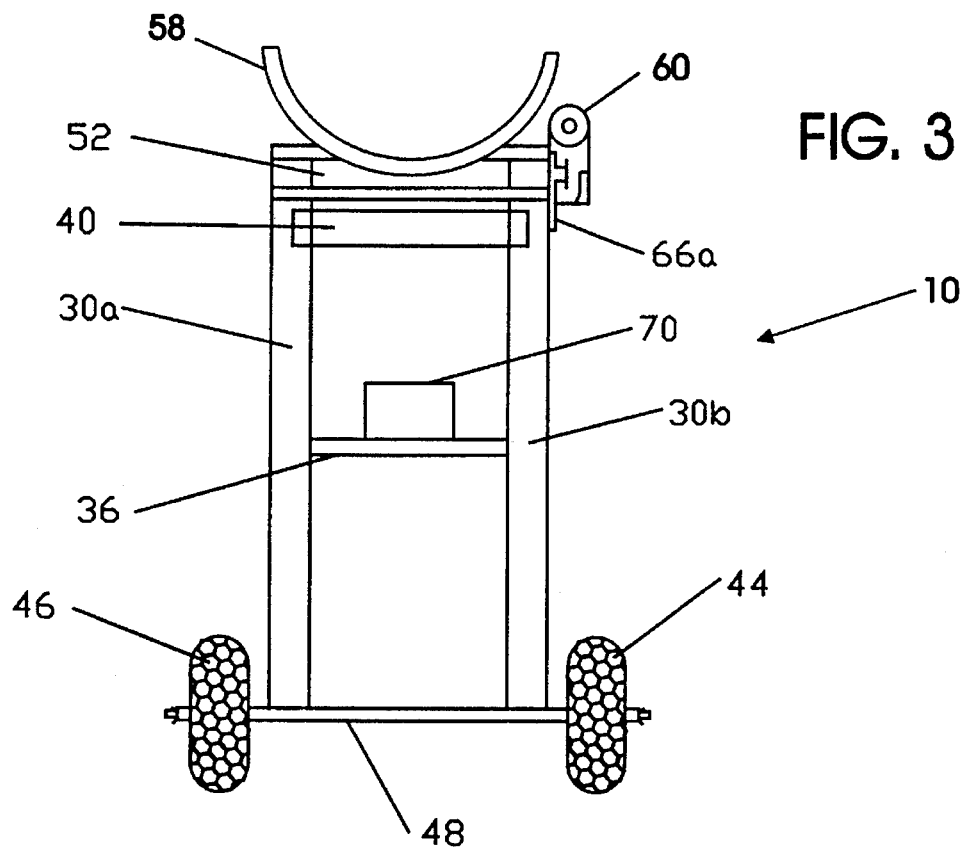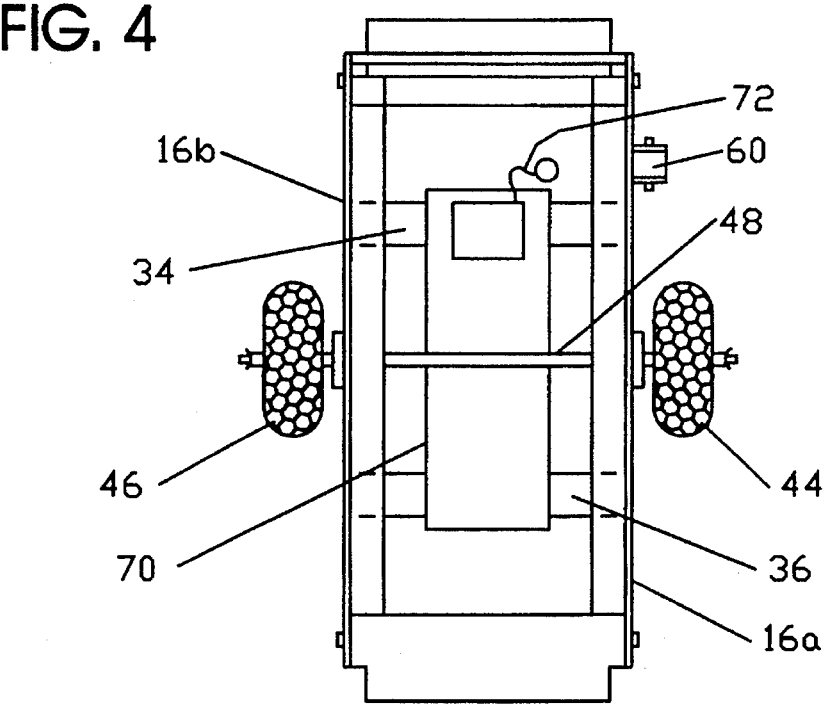

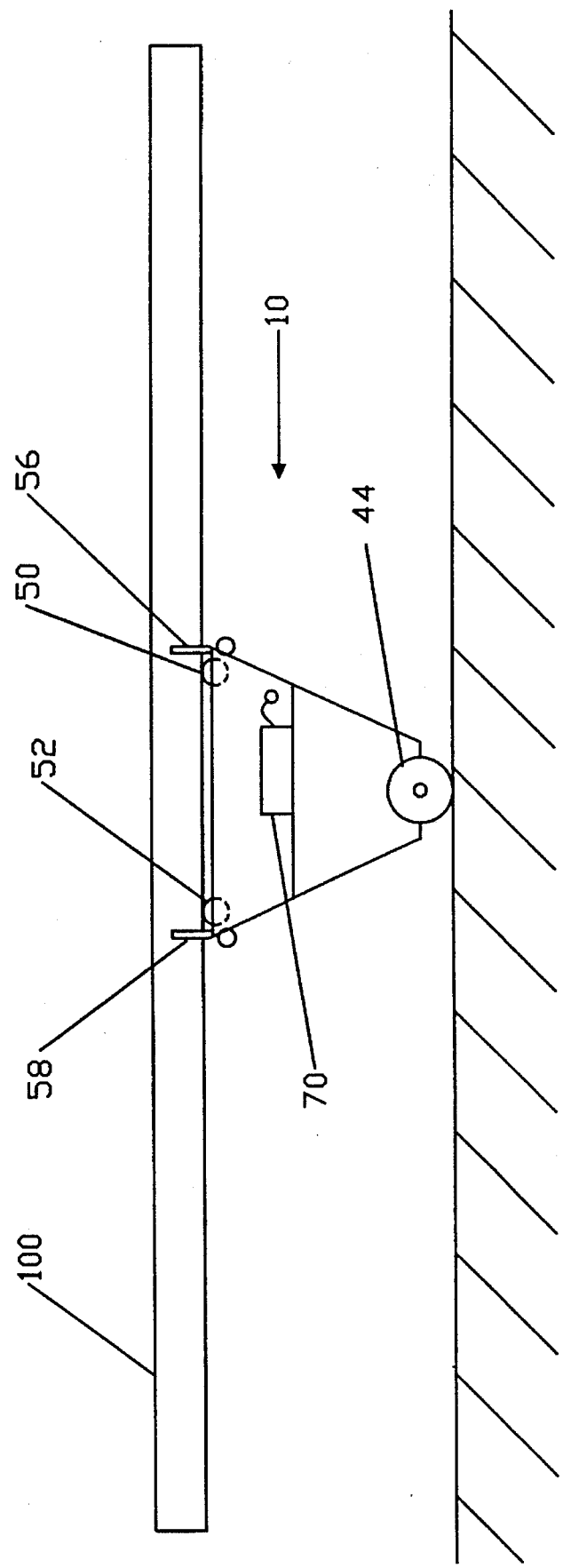

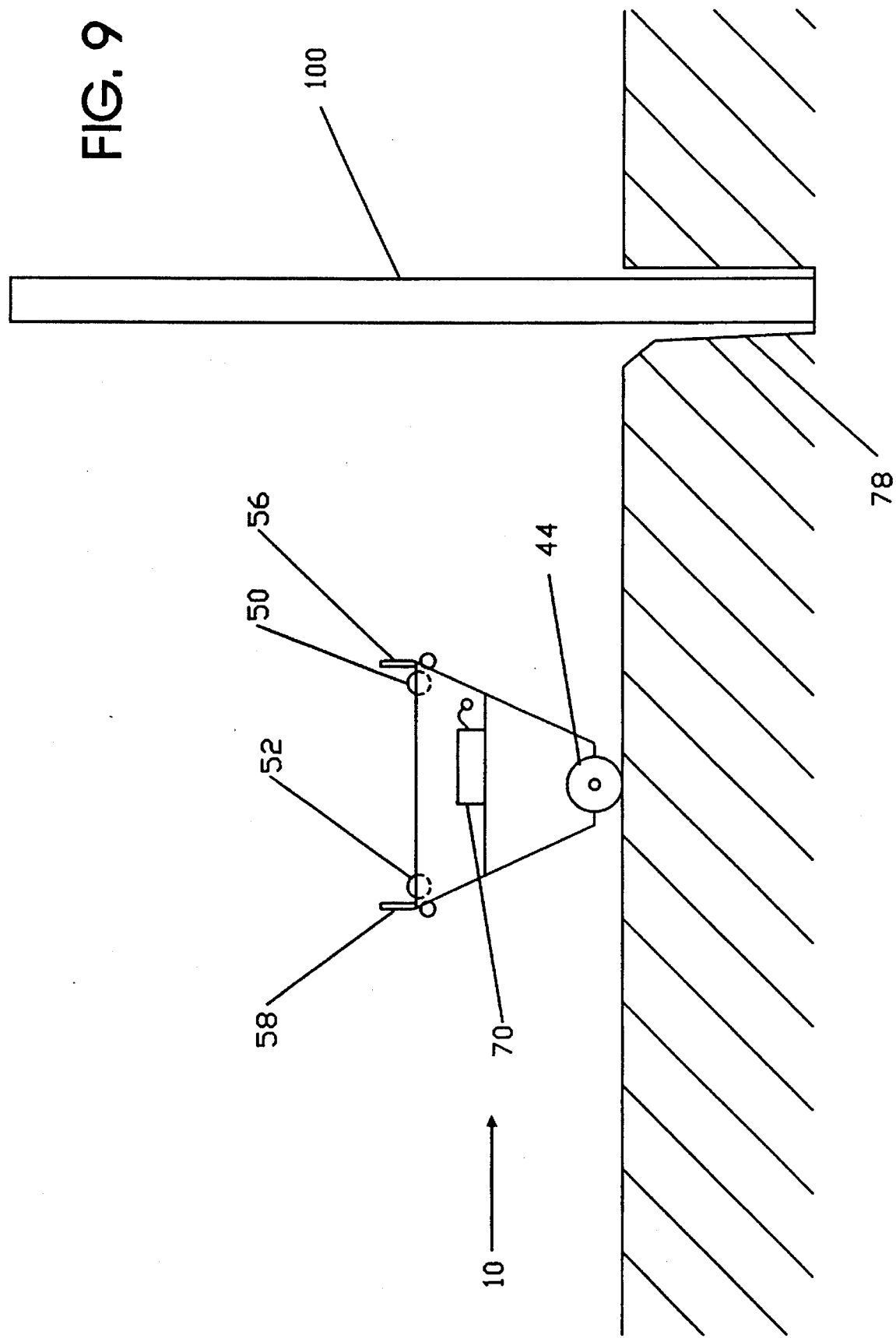

TRANSPORTING AND SETTING UTILITY POLES IN INACCESSIBLE LOCATIONS

FIELD OF INVENTION

The invention relates to the transporting and setting of utility poles, particularly light and prop poles that are set in or adjacent to the yards of utility company customers. More specifically, the invention relates to transporting utility poles in a manner that reduces property damage and setting the poles in a manner that eliminates or reduces workman injury.

BACKGROUND OF THE INVENTION

Many utility poles are set in open areas that are fully accessible by large motor vehicles. These poles are typically transported by a truck and set utilizing a derrick-mounted boom on the truck. However, the sites for many utility poles, for example light or prop poles in residential settings, are inaccessible to motor vehicles. According to time-honored practices, these poles are usually manually carried from the road to the setting site by a crew of six or more workmen. On some occasions, the poles may be dragged and winched, still requiring a large crew. Following transport, the pole is manually set in its hole by the same crew.

A large percentage of hand transport and hand setting operations result in back strain to at least one crew member. The medical costs to treat these injuries, coupled with the costs of crew members' recuperation periods, exact a high toll on utility companies.

In an effort to address the above problems, various mechanical and hydraulic systems have been proposed to assist in the transport and setting of utility poles in inaccessible locations. Representative systems are described in U.S. Pat. Nos. 1,174,950; 1,317,816; 1,470,377; 2,281,713; and 3,112,037. These systems have the common disadvantage of being overly complex and too cumbersome.

There is a need for a relatively simple, lightweight and easily maneuverable system to assist in transporting and setting utility poles in inaccessible locations. Preferably, such a system would reduce worker injuries, transport poles without property damage, be small enough to go through a thirty-six-inch gate, traverse uneven terrain, and require no more than two to three workers to operate.

SUMMARY OF THE INVENTION

The present invention provides a versatile system that achieves the several goals recited above. According to one aspect, the invention is defined as a dolly-like device including a box-like frame that is supported by a pair of wheels mounted at the bottom of the frame. The wheels supply rolling support for the frame and a utility pole loaded thereon in pole transporting operations and provide a horizontal axis of rotation for the frame during pole setting operations. Pole bearing surfaces are located at the top of the frame for continuously engaging and supporting a utility pole during both pole transporting and pole setting operations. A power winch with an associated cable is mounted on the frame at an elevation between the pole bearing surfaces and the wheels. The winch has a sufficient length so that during pole setting operations the cable may engage to an anchor point opposite the hole into which the pole is set, thereby permitting the actuated winch to pull the device toward the hole. The frame, wheels, pole bearing surfaces and winch are so positioned as to permit the device to incline up to at least 70 to 80 degrees during pole setting operations while maintaining the pole bearing surfaces in pushing engagement with the pole. In a preferred embodiment, the pole bearing surfaces comprise a pair of spaced apart transverse rollers.

In another aspect, the invention may be defined as an operational procedure for transporting and setting a utility pole at a location inaccessible to a motor vehicle. The operational procedure includes loading a utility pole onto the pole support structure of a dolly-like device of the above-mentioned type. The pole is transported to the inaccessible location by pushing the device and the pole loaded thereon along the terrain encountered. A hole for the pole is dug at the inaccessible location. As a first step in the pole setting operation, the bottom end of the pole is positioned in the hole while rotating the frame of the dolly-like device about the rotational axis of the wheels to maintain the pole support structure in contact with the pole. The winch cable is secured to an anchor point located on the opposite side of the hole from the dolly-like device. The winch is actuated to pull the device toward the hole and anchor point while continuing to rotate the frame of the dolly-like device to maintain continuous pushing engagement between the device pole support structure and the pole as the pole is raised. The pole is raised to an angle on the order of 70 to 80 degrees from horizontal at which point the pole falls into the hole and assumes a vertical position.

BRIEF DESCRIPTION OF THE DRAWINGS

Some of the objects having been stated, other objects will appear as the description proceeds, when taken in connection with the accompanying drawings, in which

FIG. 3 is a rear view of the device illustrated in FIGS. 1 and 2.

FIG. 4 is a top view of the device illustrated in FIGS. 1–3.

FIG. 5 is a view of the device of FIGS. 1–4 in use to transport a utility pole to the location where it will be set.

FIG. 9 shows the pole in a vertical position after being fully inserted in the hole.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed} to persons of skill in the appropriate arts, and not as limiting upon the present invention.

Figure 1:
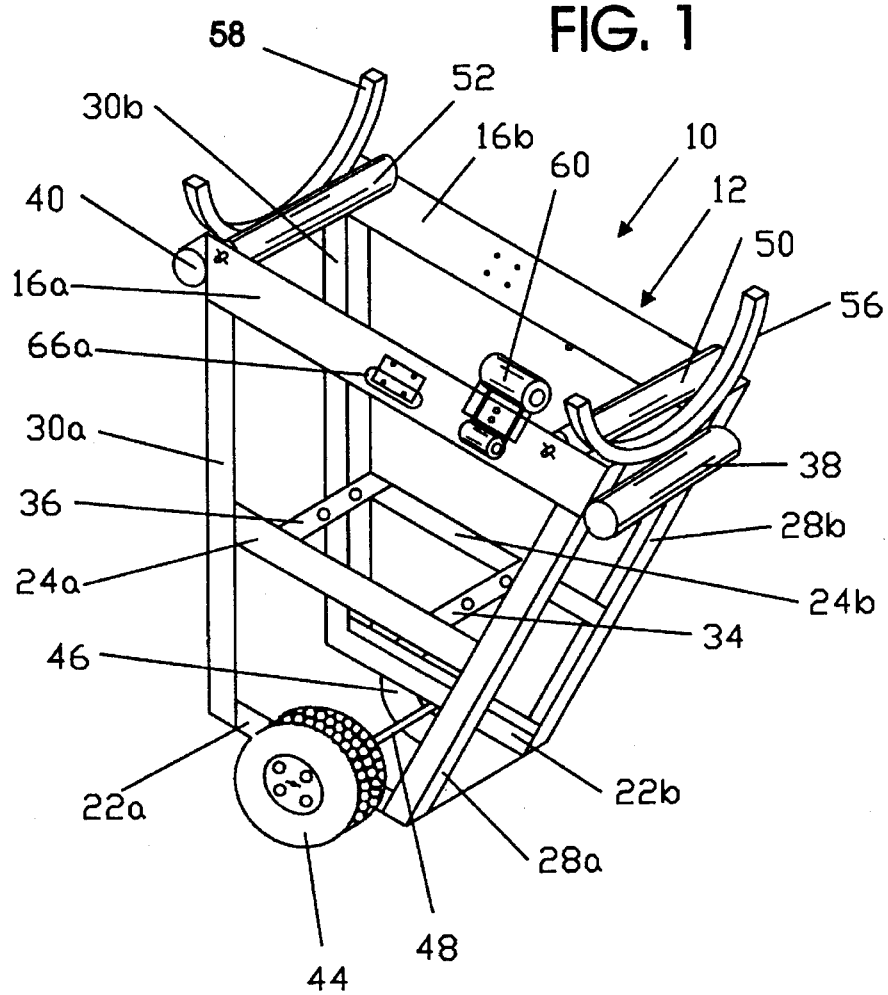
FIG. 1 is a pictorial view of a device constructed in accordance with the principles of the present invention, with the winch removed to facilitate illustration of the framework.
Figure 2:
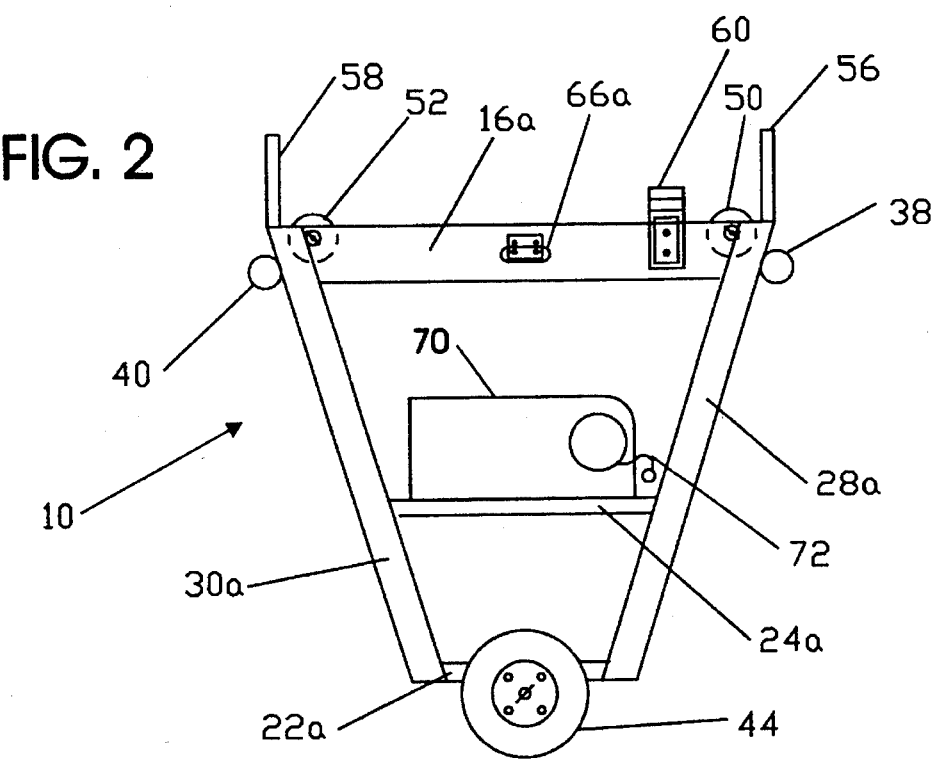
FIG. 2 is a side view of the device illustrated in FIG. 1.

Referring to the drawings, there is shown a utility pole transporting and setting device 10 constructed in accordance with the principles of the present invention. Device 10 includes a substantially box-like framework 12 formed primarily of interjoined angle iron and flat steel structural components. Framework 12, when viewed from the side (FIG. 2), has a trapezoidal shape. The two sides of framework 12 are defined by upper flat steel structural members 16*a*, 16*b*, lower angle iron member 22*a*, 22*b*, intermediate support member 24*a*, 24*b* and upright angle iron members 28*a*, 28*b* and 30*a*, 30*b*. The sides of framework 12 are joined by intermediate transverse member 34, 36 and upper transverse members 38, 40. As discussed below, intermediate members 34, 36 provide support for a power winch 70 that forms part of device 10.

Framework 12 is supported for movement on virtually any terrain commonly encountered in transporting a utility pole by a pair of wheels 44, 46 mounted on an axle 48 that extends through frame members 22*a*, 22*b*. A pole support structure is mounted at the top of framework 12 for supporting the utility pole in both transporting and setting operations. The pole support structure includes pole bearing means that may take the form of a pair of transverse rollers 50, 52 that are mounted for rotation on shafts extending between frame members 16*a*, 16*b*. Also, a pair of substantially semicircular cradle members 56, 58, welded between frame members 16*a*, 16*b*, assists in supporting the pole. In this regard, rollers 50, 52 are at a level somewhat above the surface of the cradle member 56, 58 so that the pole actually rests on the rollers, with the cradle members serving to prevent lateral shifting during both transporting and setting operations. The cradle members also serve as locator guides during loading of the pole onto the device.

A pole-securement strap 60 is fastened by a mounting bracket 62 to framework member 16*a* for the purpose of providing a tiedown strap around the utility pole when it is positioned on rollers 50, 52 and within cradle members 56, 58 during transporting operations.

A pair of handles 66*a*, 66*b* is provided on framework members 16*a*, 16*b*, respectively, for use by the workmen when the pole is being transported over relatively level terrain. An auxiliary push handle (not shown) that is approximately five feet long is designed to slide into the central opening of structural support pipe 38—projecting about twenty inches on both sides of device 10—to permit more leverage for the workmen to push the device and the pole loaded thereon over inclined or rougher terrain.

Device 10 also includes a pulling winch mounted by bolts on transverse members 34, 36 at an elevation intermediate wheels 44, 46 and rollers 50, 52. As discussed in more detail below, winch 70 and its associated cable 72 are used to provide the power for raising the utility pole as it is set in its hole. In a preferred embodiment, pulling winch 70 takes the form of a Rule® Model G2000 portable pulling winch having a gasoline motor and a maximum pull of 2000 pounds. This winch is manufactured by Rule Industries Inc., Gloucester, Mass., U.S.A. The location of winch 70 and its ability to raise the pole while pulling device 10 toward the hole and maintaining the pole in continuous contact with rollers 50, 52 will be described in detail below.

In a preferred embodiment, framework members 22*a*, 22*b*, 24*a*, 24*b*, 28*a*, 28*b*, 30*a*, 30*b* are in the form of angle iron pieces, for example, 2" by ¼" stock. Upper members 16*a*, 16*b* are formed from 4" by ¼" flat steel stock. The intermediate transverse members 34, 36 are formed from 2½" by ⅜" flat steel stock. The upper cross braces 38, 40 are formed from 2" steel pipe having a central opening for accommodating the above-mentioned auxiliary push handle. The cradle members 56, 58 are formed from shaped 1" by 1" square stock. All of these structural components are interjoined by welding to produce the substantially box-like framework 12. In this embodiment, device 10 weighs on the order of 148 pounds.

The dimensions of the preferred embodiment of device 10 are 42" high, 26" wide (including wheels) and 36" long (cradle member 56 to cradle member 58).

Pole Transport Operation

The description will now turn to a discussion of the use of device 10 in transporting a utility pole 100 from the road to an inaccessible location, for example, the back yard of a residence. First, pole 100 is loaded onto device 10 either manually or by means such as a boom so that the center of the pole roughly overlies the central portion of device 10, for purposes of balance. Thereafter, the pole preferably is strapped onto device 10 by means of tiedown strap 60. Strap 60 firmly holds pole 100 to rollers 50, 52 and prevents longitudinal shifting of the pole. Cradle members 56, 58 reduce lateral shifting. While not illustrated nor deemed necessary, rollers 50, 52 may be provided with lock mechanisms to lock them against rotation during transporting of the pole, with the lock mechanism being releasable to permit roller rotation during the pole setting operation. Once pole 100 is loaded, the workmen may push device 10 and the loaded pole in any convenient fashion. In this regard, on relatively even terrain it is generally sufficient for two workmen to push the device and pole by simply engaging handles 66*a*, 66*b* with one hand while resting another hand on the pole. A third workman, if available, may walk ahead or behind with his hands on the pole or he may choose to pull by utilizing a rope secured to the pole. When encountering relatively steep or otherwise difficult terrain, the auxiliary push handle may be inserted through steel pipe support member 38 to provide a means for giving the workmen added leverage. Finally, if the path being traveled includes a particularly steep incline, the winch cable may be attached to a tree or other object ahead in the path, utilizing the winch to pull device 10 and the pole up the steep incline.

Pole Setting Operation

Figure 6:
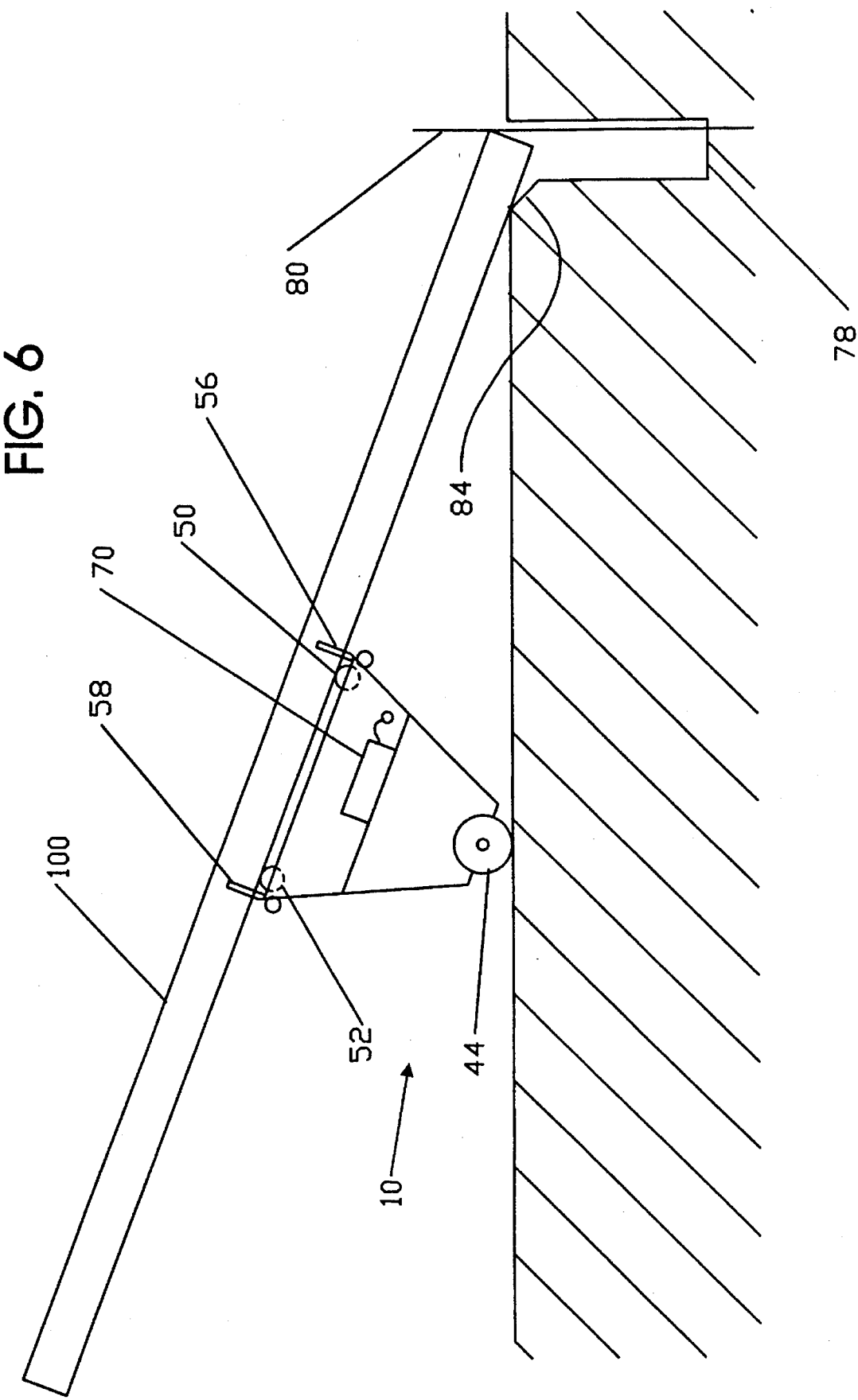
FIG. 6 shows insertion of the bottom end of the pole into its hole as a first step in the pole-setting operation.
Figure 7:
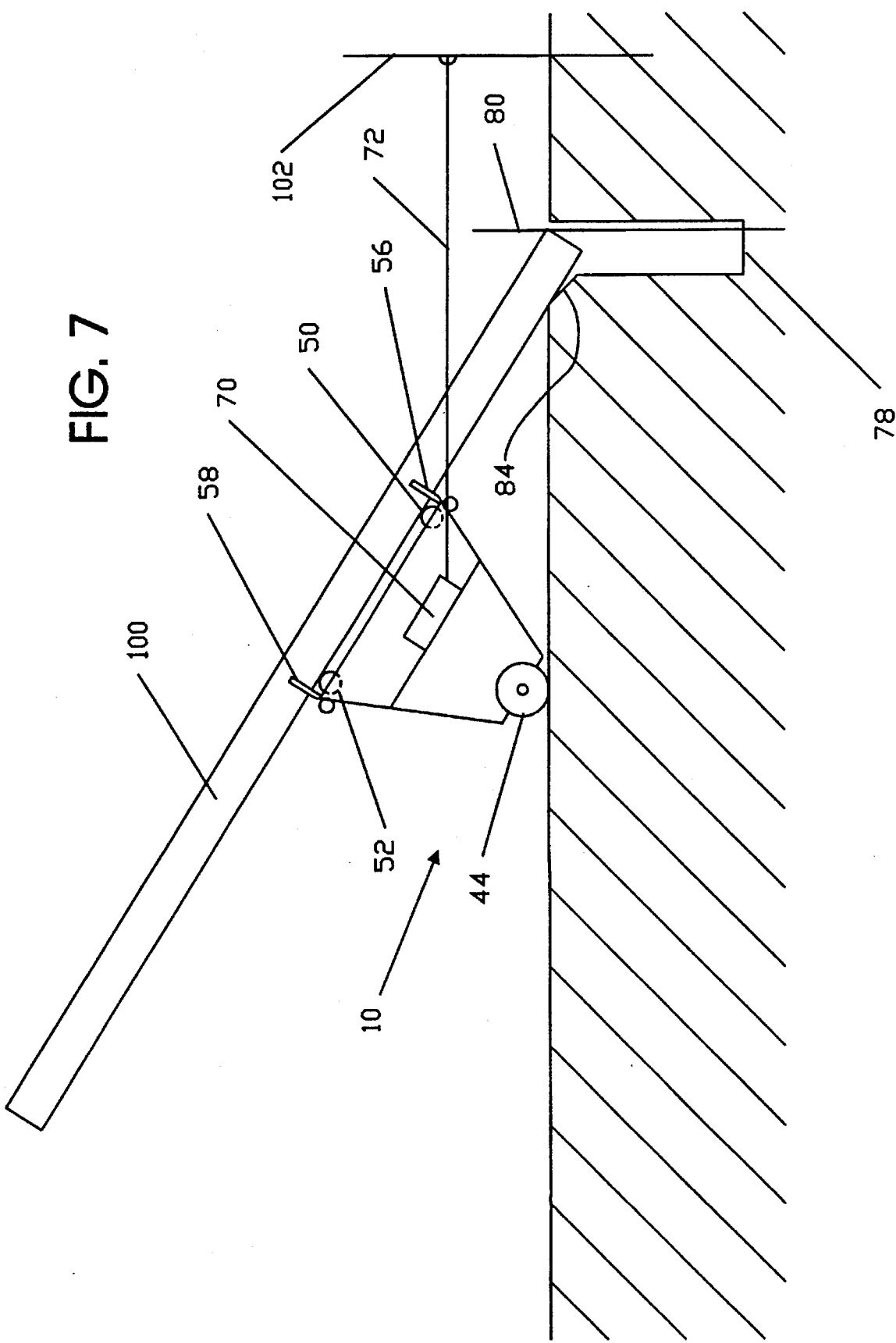
FIG. 7 shows an intermediate stage in the pole-setting operation where the pole inclination is at approximately 40 degrees from horizontal.
Figure 8:
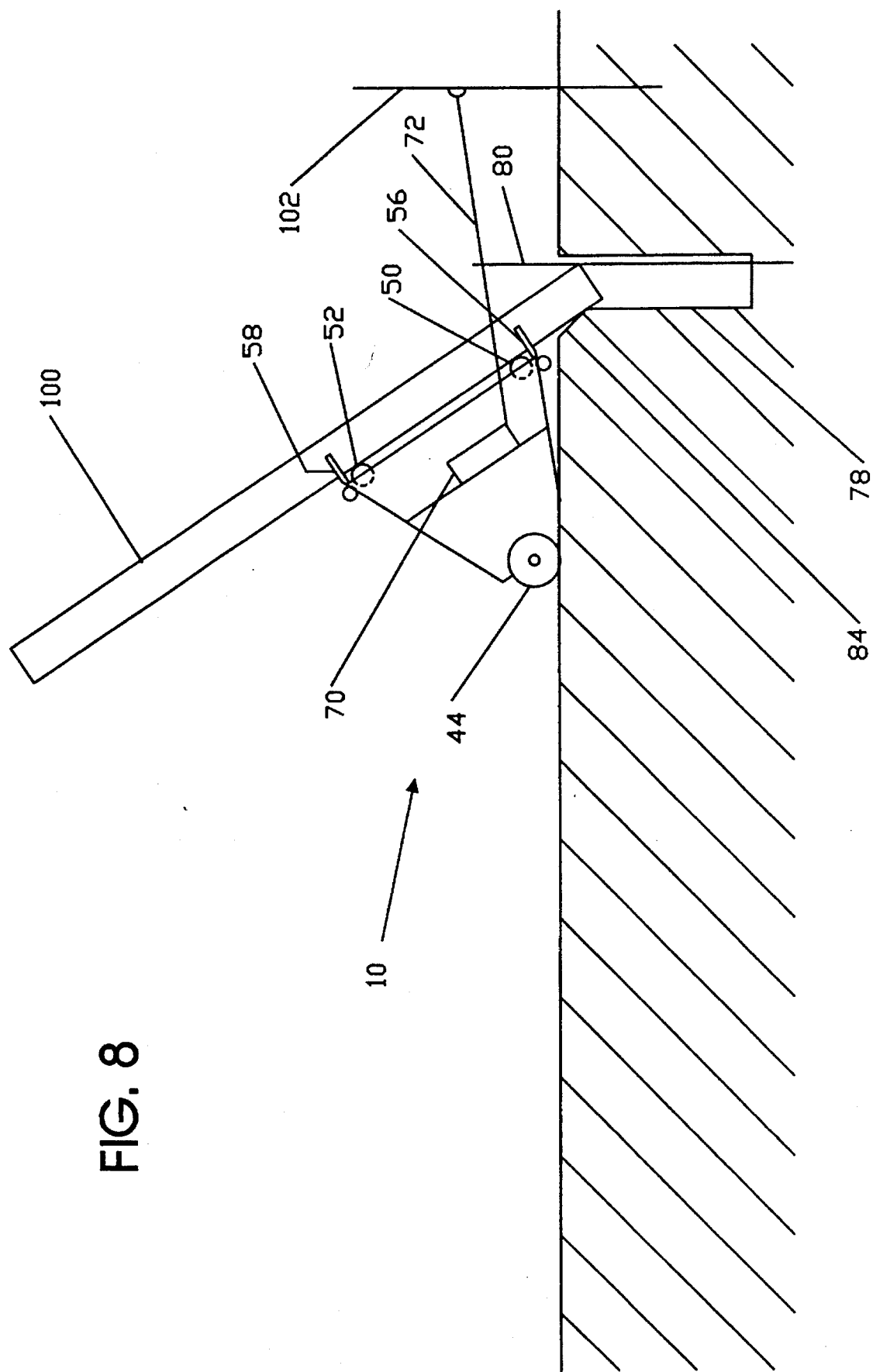
FIG. 8 shows a late stage in the pole-setting operation with the pole at approximately 70 to 80 degrees from horizontal.

The first step in the pole setting operation is to dig the hole either manually or with a power auger or the like. Once the hole 78 is dug, a guide rod 80 is inserted into the hole in a vertical orientation at the side of the hole opposite the side from which the pole will enter the hole. Next, an inclined trench or "gopher" 84 is established at the top of hole 78 on the same side as the pole to enable the bottom end of the pole to extend farther into the hole. The use of one or more guide rods 80 and gopher 84 are well known in the art. At this point, device 10 is rolled to a position where the bottom end of pole 100 overlies the hole, at which time the pole is manually tilted along with device 10 to the position shown in FIG. 6. In this position, the bottom end of pole 100 is in contact with guide rod 80. It is at this point that a significant force must be applied to raise the pole to an increasingly inclined position until such time as the pole has been raised enough—on the order of 70 to 80 degrees from horizontal—until it falls into the hole and assumes a fully vertical orientation. In the operation of the present invention, this force is supplied by winch 70. Winch cable 72 is attached to an anchor point 102 such as a tree, other natural object or an inserted metal spike located on the opposite side of the hole from device 10. The winch motor is then started so that the winch and cable pull device 10 and pole 100 toward the hole. The framework 12, wheels 44, 46, rollers 50, 52 and winch 70 are so positioned as to permit the rollers to remain in continuous pushing engagement as the pole is raised; thus, as illustrated in FIG. 6–8, framework 12 rotates about axle 48 so that the pole support plane, defined as the plane of the pole-engagement surfaces of rollers 50 and 52, is continuously inclined at the same angle from the horizontal as that of the pole, thereby maintaining both rollers in continuous pushing engagement with pole 100. Also, an unimpeded path for the winch cable from the winch to the anchor point is maintained.

During raising of the pole, one or two of the workmen may utilize ropes secured to the pole to stabilize the pole and assist in the raising operation.

It has been found that for a typical wood utility pole, the force exerted by winch 70 to begin raising the pole from the position of FIG. 6 to that of FIG. 7 is approximately 900 pounds. After the pole begins moving, the force required is less, approximately 600 pounds.

Once the pole reaches an angle of approximately 70 to 80 degrees from horizontal, it will slide against guide rod 80 to the bottom of the hole and assume a vertical position (FIG. 9). Pole setting is completed by filling in the dirt around the pole, with the optional use of a setting concrete.

It will be appreciated that an important feature of device 10 in the pole setting operation is the ability of the rollers 50, 52 to remain in pushing engagement with pole 100 at all times. This capability is best achieved by a combination of three features found in device 10: first, the ability of framework 12 to pivot or rotate about the horizontal axis defined by wheels 44, 46; second, the location of winch 70 at an elevation between wheels 44, 46 and rollers 50, 52; and, third, the provision of front-to-rear spaced apart pole bearing surfaces as provided in the preferred embodiment by rollers 50, 52.

Considering these matters in greater detail, rollers 50, 52 define front-to-rear spaced apart pole bearing surfaces that exert a pole raising force on the pole and permit the pole to slide or roll along the bearing surfaces as the pole is raised. While the use of rollers 50, 52 serve to reduce friction as the pole moves over this roller as the pole is being raised, other suitable spaced apart bearing surfaces other than rollers may be used. Also, it will be appreciated that the spaced apart bearing surfaces may be achieved by utilizing a single bearing surface that extends front to rear at the top of device 10.

Regardless of the precise structure, it has been found that the front-to-rear extent of the bearing surfaces, as distinct from a point bearing surface as would be achieved, for example, by a single roller, provides the necessary dynamic stability during pole setting operations. Furthermore, the position of winch 70 assures proper application of the pole raising force to the rollers 50, 52 and assures that the framework 12 may properly rotate or pivot about wheels 40, 46.

While the present invention has been described in connection with certain illustrated embodiments, it will be appreciated that modifications may be made without departing from the true spirit and scope of the invention.

That which is claimed is:

1. A device useful for transporting and setting a utility pole at a location inaccessible to a motor vehicle, said device comprising:

a frame;

a pair of wheels mounted at the bottom of said frame for
   (i) supplying rolling support for the frame and a utility pole loaded thereon in pole transporting operations and
   (ii) providing a horizontal axis of rotation for the frame during pole setting operations;

front-to-rear spaced apart pole bearing surfaces located at the top of said frame for continuously engaging and supporting a utility pole thereon during both the pole transporting and the pole setting operations, said pole bearing surfaces defining a pole support plane that is inclined to match the inclination of the pole being raised during pole setting operations;

a power winch with associated cable mounted on said frame at an elevation between said pole support plane and said wheels, said winch cable having a sufficient length so that during the pole setting operations the cable may engage to an anchor point opposite a hole into which the pole is to be set, thereby permitting the power winch to pull said device toward the hole; and said frame, wheels, pole bearing surfaces and winch being so positioned as to permit inclination of said pole support plane up to approximately 70 to 80 degrees during the pole setting operations while maintaining the pole bearing surfaces in pushing engagement with the pole and maintaining an unimpeded path for the winch cable from the winch to the opposite anchor point.

2. The device of claim 1 wherein said frame comprises a substantially box-like framework formed of a plurality of interjoined structural components.

3. The device of claim 2 wherein said framework has a trapezoidal shape as viewed from the side.

4. The device of claim 1 wherein said spaced apart pole bearing surfaces comprise a pair of transverse rollers.

5. The device of claim 4 including cradle members for reducing lateral shifting of a utility pole resting on said pair of rollers.

6. The device of claim 4 including a tiedown strap for securing the pole to the rollers and preventing longitudinal shifting of the pole in transporting operations.

7. The device of claim 1 wherein said power winch is located substantially directly above the axis of rotation of said pair of wheels.

8. The device of claim 7 wherein said power winch is located substantially directly below the front-to-rear midpoint of said pole support plane.

9. An operational procedure for transporting and setting a utility pole at a location inaccessible to a motor vehicle, said operational procedure comprising:

loading a utility pole onto a pole support structure of a dolly-like device having a frame, wheels mounted to the bottom of the frame and a power winch and associated cable for supplying power to raise the pole at a pole setting location;

transporting the pole to the inaccessible location by pushing the device and pole loaded thereon along the terrain encountered;

digging a hole at the inaccessible location;

as a first step in the pole setting operation, positioning the bottom end of the pole in the hole while rotating the frame of the dolly-like device about the rotational axis of the wheels to maintain the pole bearing structure in contact with the pole;

securing the winch cable to an anchor point located on the opposite side of the hole from the dolly-like device and actuating the winch to pull the device toward the hole and the anchor point while continuing to rotate the frame of the dolly-like device to maintain continuous pushing engagement between the device pole bearing structure and the pole as the pole is raised; and raising the pole to an angle of approximately of 70 to 80 degrees from horizontal and permitting the pole to then fall into the hole and assume a vertical position.

10. A system for setting a utility pole in a hole comprising:

(a) a hole in the ground for receiving a utility pole set therein;

(b) an anchor point on the side of the hole opposite the side from which the pole enters the hole;

(c) a cart device comprising:

a frame;

a pair of wheels mounted at the bottom of said frame for (i) supplying rolling support for the frame and a utility pole loaded thereon in pole transporting operations and (ii) providing a horizontal axis of rotation for the frame during pole setting operations;

front-to-rear spaced apart pole bearing surfaces located at the top of said frame for continuously engaging and supporting a utility pole thereon during both the pole transporting and the pole setting operations, said pole bearing surfaces defining a pole support plane that is inclined to match the inclination of the pole being raised during the pole setting operations;

a power winch with associated cable mounted on said frame at an elevation between said pole support plane and said wheels, said winch cable having a sufficient length so that during the pole setting operations the cable may engage to said anchor point, thereby permitting the power winch to pull said device toward said hole; and said frame, wheels, pole bearing surfaces and winch being so positioned as to permit the inclination of said pole support plane up to approximately 70 to 80 degrees during the pole setting operations while maintaining the pole bearing surfaces in pushing engagement with the pole and maintaining an unimpeded path for the winch cable from the winch to said opposite anchor point.

* * * * *